US005646812A

United States Patent [19]

Hernandez, Jr.

[11] Patent Number: 5,646,812

[45] Date of Patent: Jul. 8, 1997

[54] TELEPHONE LINE SURGE PROTECTOR MODULE WITH FAST-ACTING, HIGH RESISTANCE HEAT COIL ASSEMBLY

[75] Inventor: William Hernandez, Jr., Central Islip, N.Y.

[73] Assignee: Porta Systems Corp., Syosset, N.Y.

[21] Appl. No.: 510,897

[22] Filed: Aug. 28, 1995

[51] Int. Cl.[6] .................... H02H 1/04

[52] U.S. Cl. .................... 361/124; 29/618; 361/119

[58] Field of Search .................... 361/124, 119, 361/117–118; 29/605–607, 612, 618; 493/949; 379/26–27

[56] References Cited

U.S. PATENT DOCUMENTS

| | | | |
|---|---|---|---|
| 3,947,730 | 3/1976 | De Luca et al. | 361/124 |
| 4,069,509 | 1/1978 | De Luca | 361/124 |
| 4,288,660 | 9/1981 | Fasano | 379/27 |
| 4,318,153 | 3/1982 | Fasano | 361/119 |
| 5,106,701 | 4/1992 | Kurosaka et al. | 428/606 |

*Primary Examiner*—Jeffrey A. Gaffin
*Assistant Examiner*—Michael J. Sherry
*Attorney, Agent, or Firm*—Hoffmann & Baron

[57] ABSTRACT

A telephone line surge protector module with fast-acting, high resistance heat coil assembly includes a plurality of turns of resistive heating wire having a conductive core, a heat-resisting insulative coating, and a relatively high tensile-strength serving for resisting manufacturing stresses. The serving permits a number of turns of the wire to be tightly wound about a bobbin, without being damaged due to stresses encountered in the manufacturing process. The heat resisting insulative coating prevents shorting between the turns at high temperatures, yet is thin enough so that inter-turn thermal conductance is not degraded. The serving is preferably formed of a material that softens or liquifies at high temperatures to enhance inter-turn thermal conductance. The module with fast-acting coil is suitable for protecting sensitive electronic digital switches.

9 Claims, 5 Drawing Sheets

TELEPHONE LINE SURGE PROTECTOR MODULE WITH FAST-ACTING, HIGH RESISTANCE HEAT COIL ASSEMBLY

BACKGROUND OF THE INVENTION

1. Field of the Invention

The present invention relates to telephony, and more particularly relates to telephone line surge protector modules.

2. Description of the Prior Art

Telephone line surge protector modules are well-known devices. One such device is described in U.S. Pat. No. 3,947,730 to DeLuca et al., issued Mar. 30, 1976, the disclosure of which is incorporated herein by reference. Protector modules normally accommodate both the telephone line tip (conversation) and ring circuits.

A typical protector module includes a transient over-voltage device designed to short the affected circuit to ground in the event of an over-voltage condition. Early modules employed a simple air gap with a pair of arcing electrodes; dielectric breakdown of the air in the gap allowed arcing to ground during the over-voltage condition. Later devices have employed sealed tubes incorporating a pair of spaced-apart arcing electrodes and containing a gas of known dielectric strength.

Recent developments in telephone switch gear involve the use of electronic digital switches. Although such switches offer many advantages over prior art devices, they suffer from greater sensitivity to high voltage spikes and current surges. Accordingly, there is much interest in developing a telephone line surge protector module that incorporates a transient over-voltage device which can actuate more rapidly than prior-art gas-tube devices. Such modules have been developed, using fast-acting solid state over-voltage protection devices. These solid state devices, although faster than gas tubes, are unable to tolerate as much energy dissipation as gas tubes.

In addition to over-voltage protection, telephone line surge protector modules typically include protection against excessive current, as well, most often by a thermally activated device responsive to Ohmic heating produced by the over-current. One well-known thermal device is the heat coil, wherein a coil of resistive heating wire wound about a bobbin carries the circuit current. An elastically-biased ground contact is fastened to the bobbin with a low melting point solder. When the circuit current exceeds a predetermined value, corresponding to an over-current condition, the Ohmic heat generated in the coil melts the low melting point solder and the elastically-biased ground contact is free to short the affected circuit to ground. In some applications, it is desirable to open the circuit under spike and surge conditions, rather than grounding it.

In view of the increased delicacy of electronic digital switches used in telephone switch gear, as well as the low energy dissipation tolerance of solid-state over-voltage protection devices frequently employed with such switches, there is a need for a fast-acting, high resistance heat coil assembly to provide over-current protection in telephone line surge protector modules. Prior art heat coils suffer from the disadvantage of limited electrical resistance due to thermal and structural constraints, thereby limiting the Ohmic heating (and lengthening actuation time) for a given current level.

OBJECTS AND SUMMARY OF THE INVENTION

It is an object of the present invention to provide a fast-acting, high resistance heat coil assembly which can be used in a telephone line surge protector module for protecting sensitive digital electronic telephone switch gear.

It is another object of the present invention to provide a fast-acting, high resistance heat coil assembly that can be readily mass-produced with automated equipment.

It is yet another object of the present invention to provide a fast-acting, high resistance heat coil assembly that retains its inter-turn insulation even under high current conditions.

It is a further object of the present invention to provide a method of economically manufacturing a fast-acting, high resistance heat coil assembly.

It is still a further object of the present invention to provide a method of manufacturing a fast-acting, high resistance heat coil assembly wherein the conductor of the heater wire is protected from excessive mechanical stresses during fabrication.

It is yet another object of the present invention to provide a telephone line surge protector module with a fast-acting high resistance heat coil assembly that overcomes the disadvantages of known telephone protector modules.

In accordance with one form of the present invention, a fast-acting, high resistance heat coil assembly includes a plurality of turns of resistive heating wire wound about a bobbin. The resistive heating wire includes an electrically conductive core, a heat-resisting insulative coating, and a relatively high tensile strength serving for resisting manufacturing stresses. An elastically biased contact member is fastened to (and restrained by) the bobbin via a low melting point solder or other thermally responsive fastening method.

In a first temperature range, for example, below the melting point of the solder, the bobbin and contact member are fixed. In a second temperature range, for example, above the melting point of the solder, the bobbin and contact member are no longer fixed, and the contact member, no longer restrained by the bobbin, is elastically biased against a ground plane.

Heretofore, design of a commercially viable fast-acting high resistance heat coil assembly has been considered impractical because the requirements of low inter-turn thermal resistance, high wire tensile strength for manufacturing, small wire cross-section and large number of turns for high electric resistance, and high temperature compatible electric insulation to prevent shorting at high temperatures, have been considered mutually conflicting. Surprisingly, it has now been discovered that all requirements can be met by use of an appropriately insulated wire with a reinforcing serving in accordance with the present invention. The insulative coating is made of heat resistant material, formed in a thin layer to minimize inter-turn thermal resistance, while the high tensile strength serving is made of a material that actually enhances the inter-turn thermal conductance in the second temperature range.

In a method according to the present invention, a length of resistive heating wire including an electrically conductive core, a heat-resisting insulative coating, and a relatively high tensile strength serving for resisting manufacturing stresses is fastened to a bobbin, and is wound about the bobbin under tension sufficient to effectively minimize thermal contact resistance between the turns formed during the winding.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
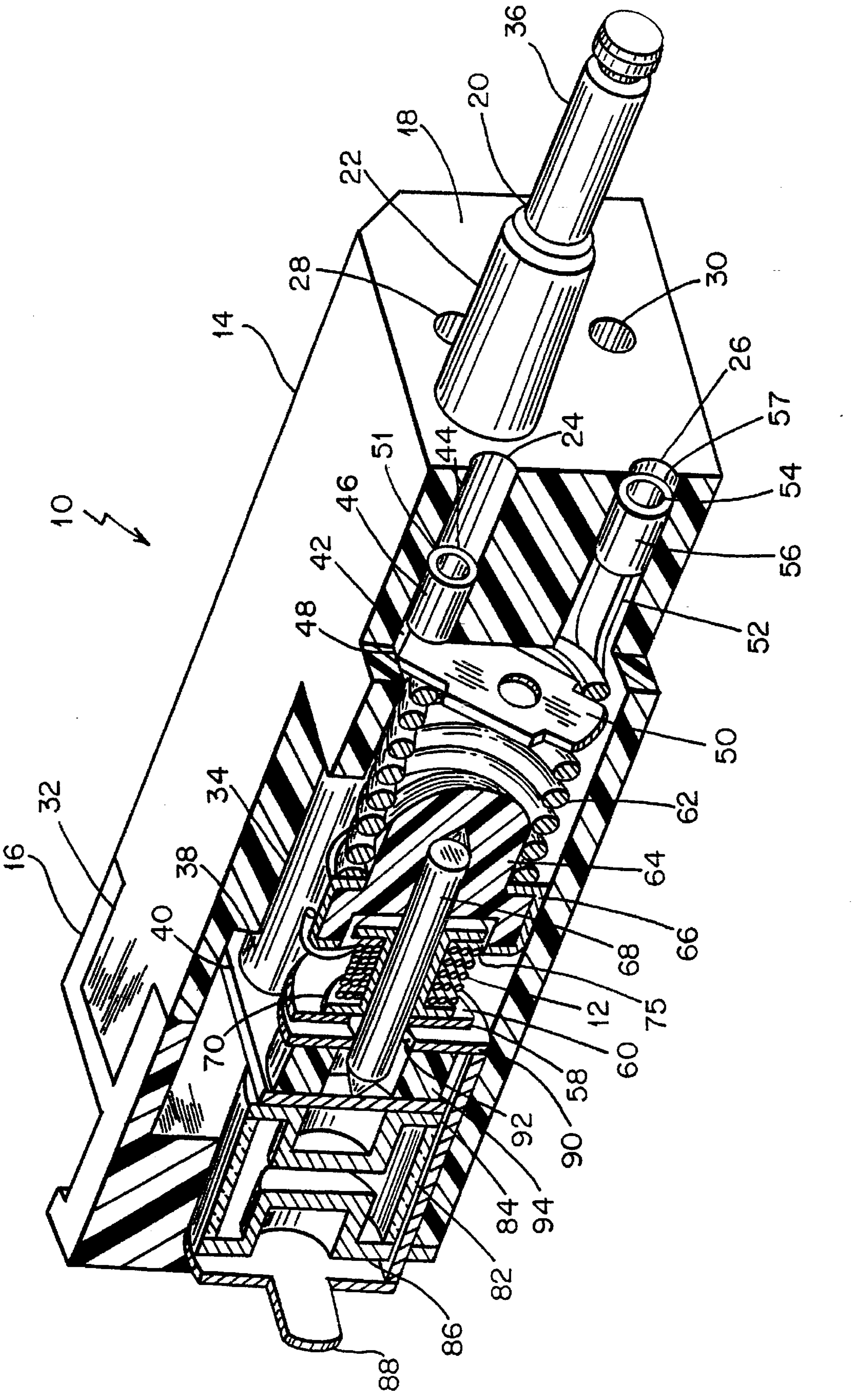
FIG. 1 is a cut-away perspective view of one type of telephone line surge protector module incorporating a fast-acting high resistance heat coil assembly according to the present invention.

Referring to FIG. 1, a telephone line surge protector module, designated generally as 10, incorporates a fast-acting, high resistance heat coil assembly 12 in accordance with the present invention. Module 10 includes a generally hollow body 14 with a cap 16. Body 14 has a first end 18 with a main bore 20. Preferably, main bore 20 extends through first end 18 and through ferrule 22 formed in first end 18.

First end 18 of body 14 also includes at least first and second contact points, 24 and 26 respectively, to accommodate a telephone circuit to be protected. Since telephone lines generally include both tip (conversation) and ring circuits, preferably third and fourth contact points, 28 and 30 respectively, are also included, so that both circuits can be accommodated by a single module. As used herein, "contact point" means a location at which an external electrical contact (not shown) can be secured.

Body 14 also includes a second end 32 sized and shaped to receive cap 16. Preferably, second end 32 and cap 16 are a snap fit. Body 14 and cap 16 may be formed from, for example, a resilient, electrically insulating plastic material such as polybutylene terephthalate as sold by the General Electric Company under the trademark VALOX.

An elongated ground pin 34 has a first end 36 inserted in main bore 20 and protruding from ferrule 22, and also has a second end 38 formed with a ground plane 40. Pin 34 and ground plane 40 can be made of a suitable electrically conductive material, such as, for example, free-machining brass plated with 60/40 tin-lead solder.

A first contact such as short contact 42 has a first end 44 sized and shaped to interface with first contact point 24. As used herein with respect to contact points and contacts, "interface" means that an external electrical contact (not shown) to be connected at a given contact point would be electrically interconnected with the end of the contact interfacing with that contact point. One possible method of achieving the desired interface is to form a bore at the contact point, with the end of the contact having a hollow cylindrical shape 46 that conforms to the bore, for receipt of an external cylindrical plug contact (not shown). Short contact 42 also has a second end 48 formed with a contact surface 50. A step 51 can be provided, if desired, on which first end 44 can bottom out.

Figure 2:
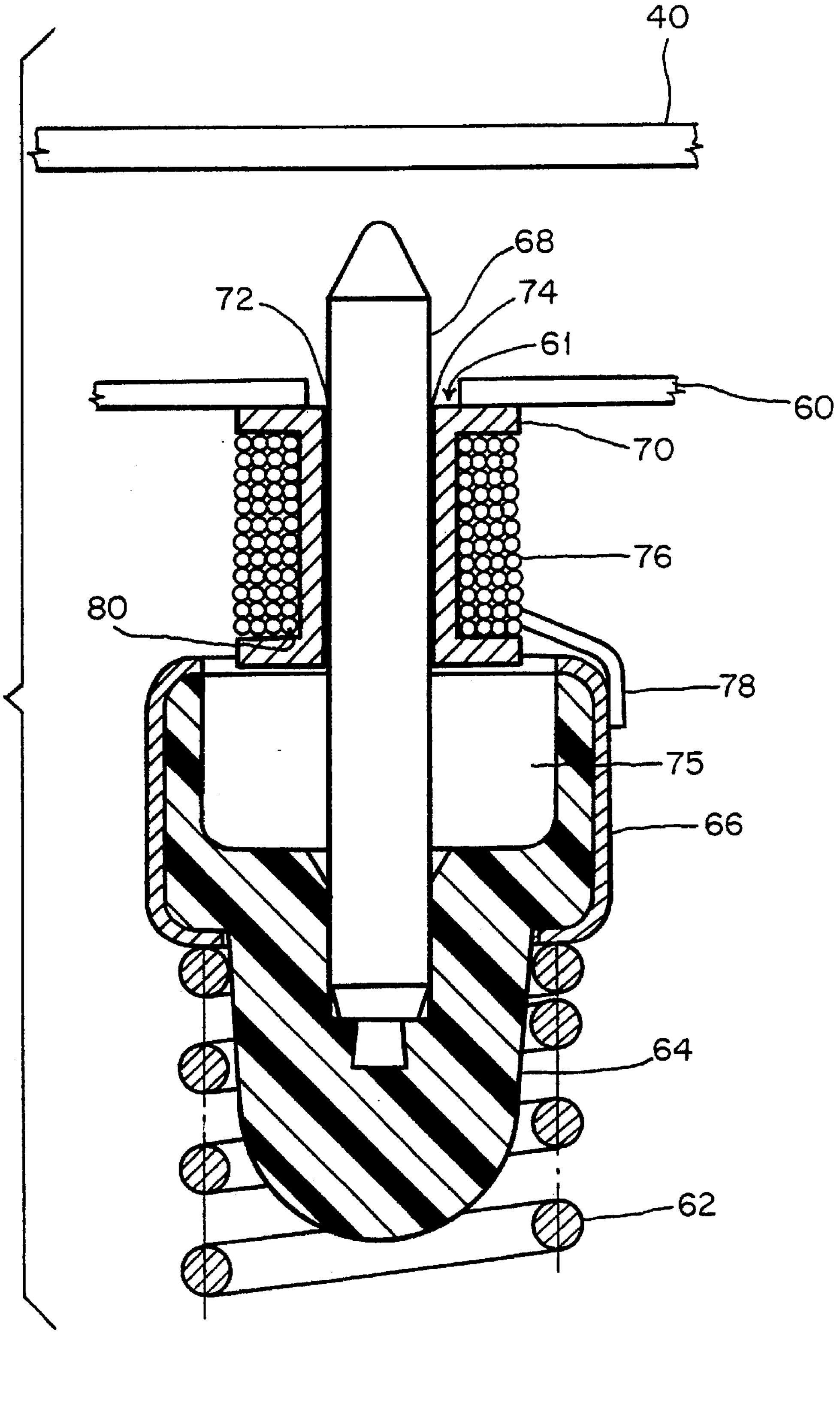
FIG. 2 is a cross-sectional elevation of a fast-acting, high resistance heat coil assembly according to the present invention, showing the coil in an "unfired" condition.
Figure 3:
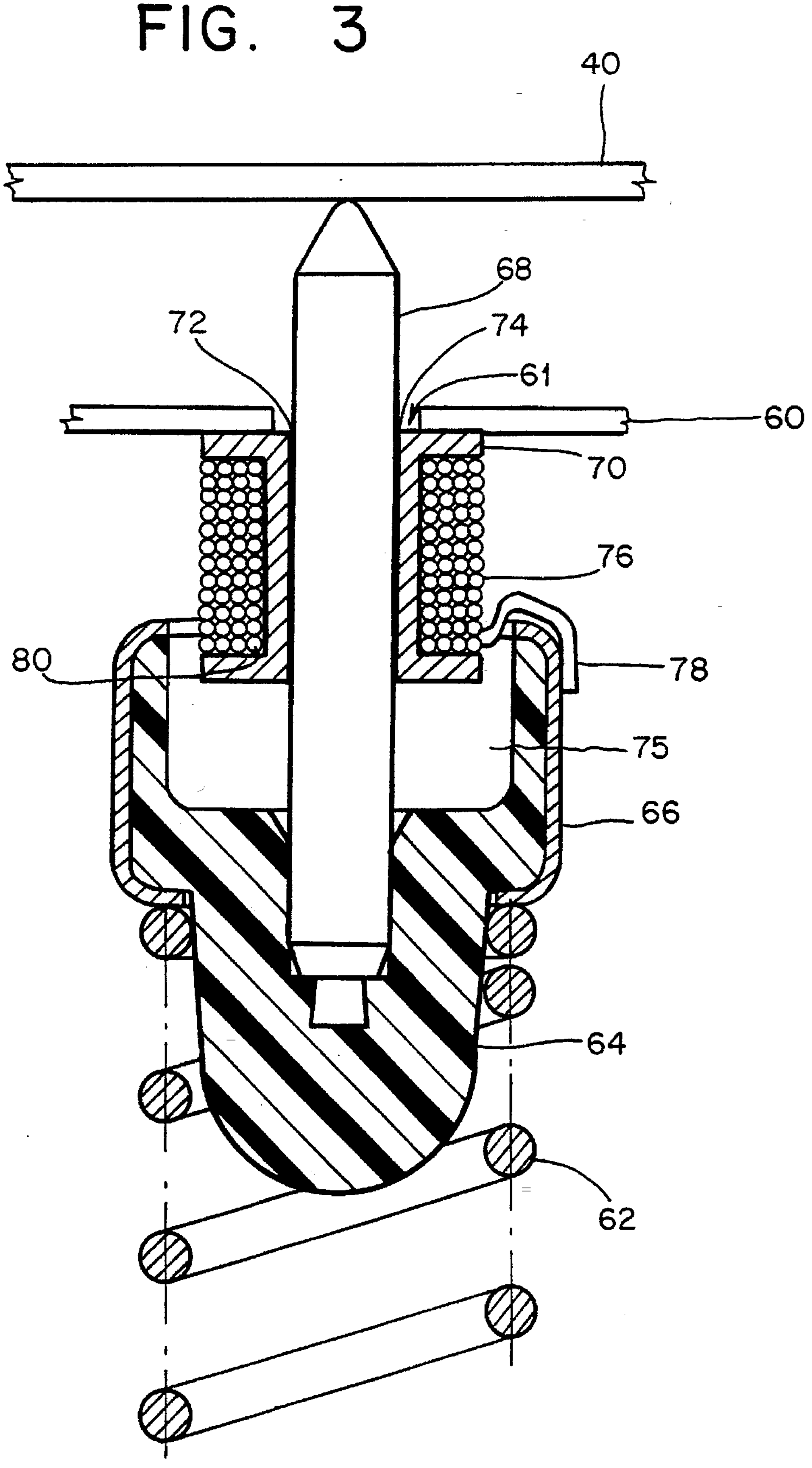
FIG. 3 is a cross-sectional elevation similar to FIG. 2, but showing the coil in a "fired" condition.

A second contact such as long contact 52 has a first end 54 sized and shaped to interface with second contact point 26, preferably through use of a hollow cylindrical shape 56 similar to shape 46 of short contact 42. A step 57, similar to step 51, can be provided, if desired, to bottom out first end 54. Long contact 52 also has a second end 58 formed with a contact surface 60. Surface 60 is preferably provided with an opening 61 (as best seen in FIGS. 2 and 3) for purposes discussed below. Second end 58 of long contact 52 can be disposed opposite second end 48 of short contact 42 to define a heat coil receiving gap, within which is located heat coil assembly 12. It will be appreciated that a second pair of long and short contacts can be interfaced with third and fourth contact points 28 and 30, defining a gap for receipt of a second heat coil assembly, so that both tip and ring circuits can be protected. The short contact 42 and long contact 52 can be made of, for example, phosphor bronze or beryllium copper plated with 60/40 tin-lead solder.

Referring now to FIGS. 1, 2 and 3, the construction and operation of fast-acting, high resistance heat coil assembly 12 will be described. The heat coil assembly includes an elastically biased contact member. Such a member may be formed of, for example, the assembly of spring 62, insulated spring follower 64 with conductive shell 66, and contact pin 68. Pin 68 is preferably received in follower 64 and can be retained by, for example, a press fit. Shell 66 is preferably disposed about follower 64, and can be retained by, for example, crimping. Spring 62 is preferably disposed about follower 64 for stable transmission of force.

Pin 68 can be made of, for example, free-machining brass, while spring 62 is preferably made of phosphor bronze plated with 60/40 tin-lead solder. Follower 64 is preferably made of polycarbonate such as that sold by the General Electric Company under the trademark LEXAN, and shell 66 is preferably made of free-machining brass plated with 60/40 tin-lead solder.

Heat coil assembly 12 also includes bobbin 70. Bobbin 70 is secured to the elastically biased contact member in a first temperature range to prevent relative motion between the bobbin and the contact member; however, in a second temperature range, bobbin 70 and the contact member are moveable with respect to one another. One method of accomplishing this is to provide a bore 72 through bobbin 70 for receipt of contact pin 68, as best seen in FIGS. 2 and 3. Contact pin 68 may then be fastened to bobbin 70 by a fillet of low melting temperature solder 74. Bobbin 70 is preferably formed of free-machining brass.

In the first temperature range, below the melting point of solder fillet 74, contact pin 68 and bobbin 70 are rigidly fastened together. This corresponds to an "untripped" or "unfired" condition of the heat coil assembly 12, wherein the protected circuit is not grounded. In the second temperature range, above the melting point of solder fillet 74, contact pin 68 and bobbin 70 are free to move relative to each other. This corresponds to the "tripped" or "fired" condition of the heat coil assembly 12, wherein the protected circuit is grounded. Bobbin receiving chamber 75 can be provided to at least partially receive bobbin 70 in the "tripped" condition.

Heat coil assembly 12 also includes a length of resistive heating wire 76, a plurality of turns of which are wound about bobbin 70. The construction of wire 76 is discussed below. A first end 78 of wire 76 is electrically interconnected with conductive shell 66, while a second end 80 of wire 76 is electrically interconnected with bobbin 70. The electrical interconnections of the wire may be carried out by, for example, capacitive discharge welding. It is to be understood that, while wire 76 is wound about bobbin 70 in the illustrative example, alternative configurations could be provided where the wire is wound about, for example, contact pin 68 or both pin 68 and bobbin 70, and wherein bobbin 70 is included primarily for structural purposes.

Referring again to FIG. 1, a path for current flow is provided through short contact 42, spring 62, shell 66, wire 76, bobbin 70, and long contact 52. It will be appreciated that current flowing in the circuit to be protected passes through wire 76. Accordingly, wire 76 will be subject to Ohmic heating with a thermal power dissipation given by the well-known formula:

$$P=I^2R$$

where P is power dissipation in watts, I is current in amps, and R is the resistance of the wire in ohms. The Ohmic heating is used to melt the solder fillet 74 in a predetermined time at a predetermined current value.

As discussed below, the predetermined time and current value are generally set by an external specification. The coil heat dissipation, effective thermal inertia of the heat coil assembly (including a small component associated with the latent heat of fusion of the solder fillet), the various thermal conductances within the heat coil assembly, and the thermal coupling to the sink temperature then must be selected so as to conform to the specified trip time and current values.

As shown in FIG. 2, in the "untripped" or "unfired" condition, spring 62 biases shell 66, insulated follower 64, and contact pin 68 (which is preferably a press fit in follower 64) towards ground plane 40. However, bobbin 70 bears against contact surface 60, and contact pin 68 is prevented from touching ground plane 40 by virtue of a shear load developed in solder fillet 74. It will be apparent that opening 61 in contact surface 60 is provided to permit protrusion of contact pin 68. As used herein, when the bobbin 70 and the elastically biased contact member are referred to as being located in the heat coil receiving gap defined between second ends 58 and 48 of long contact 52 and short contact 42, this condition is considered to be inclusive of a state where a portion of the elastically biased contact member, such as contact pin 68, protrudes through an opening such as opening 61.

Referring now to FIG. 3, it can be seen that in the "tripped" or "fired" condition, solder fillet 74, in its molten state, can no longer support the shear load imposed by spring 62. Thus, contact pin 68 and bobbin 70 are free to move with respect to one another and contact pin 68 can contact ground plane 40, thereby grounding the affected circuit. It will be appreciated that only the solder fillet itself needs to enter the second temperature range; however, any structure between the heat coil and fillet will inherently have a higher temperature than the fillet. As used herein, the bobbin and elastically biased contact member will be said to have been "substantially transitioned" into the second temperature range once they can trip (for example, once the solder fillet can melt), even though portions of the bobbin and/or contact member may still reside in the first temperature range.

Referring again to FIG. 1, which shows heat coil assembly 12 in a "tripped" or "fired" condition, over-voltage protection can be provided by an over-voltage protection device such as gas tube 82. While it is anticipated that the present invention will most often be used with solid-state over-voltage protection devices, gas tube 82 is shown for illustrative purposes. Tube 82 can have a first electrode 84 in contact with ground plane 40, and a second electrode 86 in contact with gas tube contact 88. Gas tube contact 88 has an opposite end 90 that abuts second end 58 of long contact 62. An opening 92 corresponding to opening 61 is provided in opposite end 90 for passage of contact pin 68. Insulating block 94, with a bore for passage of pin 68, separates opposite end 90 from ground plane 40. An over-voltage condition in the protected circuit causes the electric potential of gas tube contact 88 to be so much greater than ground potential that dielectric breakdown of the gas in gas tube 82 occurs and the over-voltage is shorted to ground. The over-voltage protection device is designed to short out at a predetermined trip voltage value. Note that as used herein for both over-voltage and over-current protection, shorting a circuit to ground is synonymous with providing a path to ground for the first and second contacts associated with that circuit.

Performance criteria of over-current protection devices generally include a specification of one or more "trip" current values and associated maximum trip times, plus a "hold" current that must be carried indefinitely without tripping. For example, a typical specification might be: trip in 2.5 seconds or less at 1 amp, trip in 11.5 seconds or less at 0.5 amps, and hold 0.2 amps indefinitely (in practice, for a minimum of three hours). Of course, in a working device, a current greater than a specified trip value will generally result in tripping even faster than at the specified current.

In a thermally responsive device, assuming the thermal inertia and the thermal couplings to the sink temperature to be essentially constant, the higher the level of heat dissipation, the faster the trip time. At any predetermined current value, the $I^2R$ dissipation increases with the heat coil resistance; thus, to achieve quick reaction times, it is desirable to increase the electrical resistance of the heat coil. In order to do so, for a given alloy having a given electrical resistivity, it is necessary to use a wire with a smaller cross-sectional area, a greater length (i.e., more turns), or some combination of the two. Of course, a smaller diameter wire can accommodate more turns in the same volume than a larger wire.

Reducing the cross-sectional area of the wire results in a lower wire tensile strength. As discussed below, automated heat coil manufacturing techniques require that the wire be tensioned during manufacturing, as the wire is wound onto the bobbin, to minimize inter-turn thermal contact resistance. Thus, the weakness of small diameter, high-resistance wires is one factor that previously prevented the practical development of a fast-acting, high resistance heat coil assembly.

Another problem with such development is the higher temperature at which such coils operate. Ordinary insulative coatings, previously used to coat wire conductors in heat coils, can degrade and even melt at high temperatures, resulting in turn-to-turn shorting with concomitant reduction in coil resistance, thereby reducing power dissipation and defeating the very purpose of the fast-acting heat coil. Typical high temperature insulations used in other applications, such as enamel, add effectively no tensile strength to the wire, so that breakage is still possible during manufacturing. Thick insulations can have the undesirable effect of reducing the inter-turn thermal conductance, thereby lengthening the trip time and driving the maximum coil temperature higher.

With the present invention, the problem of reduced tensile strength is solved by providing one or more serving layers of relatively high tensile strength fiber surrounding the conductive core and insulative coating of the wire. The fiber serving provides a parallel load path for the tensile loads induced during manufacture, reducing or eliminating breakage during manufacturing. Since the fiber serving can result in reduced inter-turn thermal conductance, similar to the problems associated with thick insulation, the full benefit of the present invention is best achieved by using a heat-transfer-enhancing serving as described below.

The present invention reduces or eliminates the foregoing difficulties by providing a very thin layer of high-temperature insulation around the conductive core of the wire. This insulation does not melt at high temperatures encountered in operation of the coil, thereby preventing inter-turn shorting, and it is also thin enough so that it does not degrade inter-turn thermal conductance. A serving is provided that includes one or more layers of high tensile strength yarn twisted about the insulation and core. The yarn is preferably made from a material that softens or even melts at high temperatures characteristic of coil tripping. In this way, the serving enhances rather than impedes the flow of heat between the turns of the coil. As a minimum, the softened material fills any air gaps, and since its effective thermal conductivity is greater than that of the air gaps, heat transfer is enhanced. Further enhancement is possible in a molten state, by means of free convective heat transfer. The word "deformable" is used herein to encompass materials exhibiting one or both of softening and melting in the temperature ranges of interest.

Figure 4:
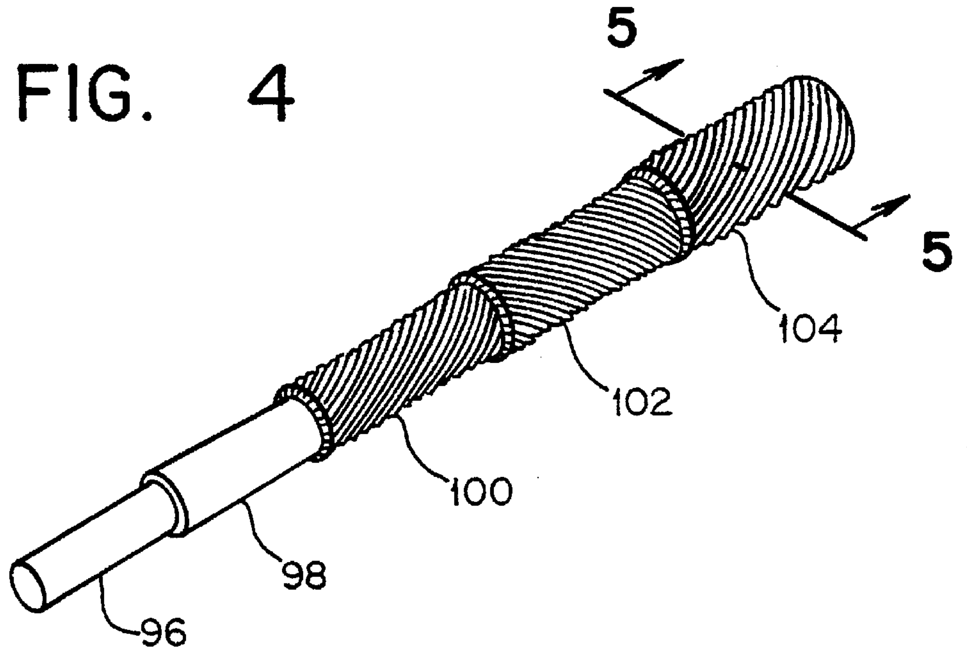
FIG. 4 is a cut-away perspective view of a length of resistive heating wire used with a heat coil assembly according to the present invention.
Figure 5:
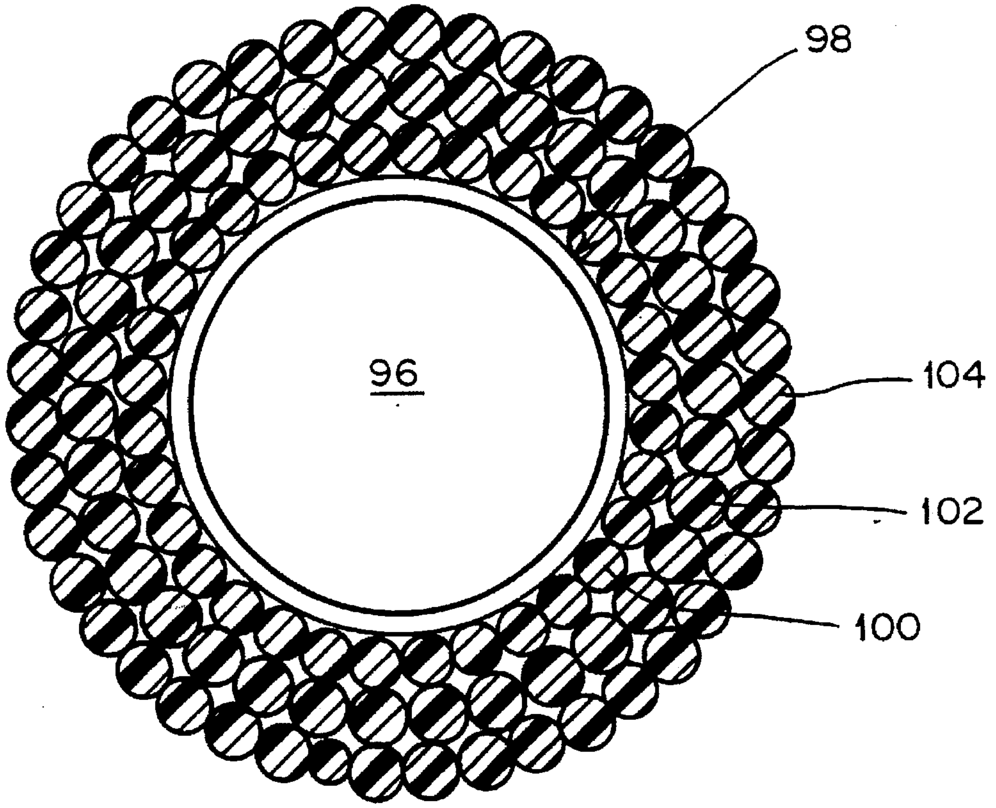
FIG. 5 is a cross-sectional view through the wire taken along line 5—5 of FIG. 4.

Referring to FIGS. 4 and 5, a length of resistive heating wire 76 formed in accordance with the present invention includes conductive core 96, heat-resisting insulative coating 98 applied to the outside of core 96, and first, second and third serving layers 100, 102 and 104 respectively. The first, second and third layers are disposed successively radially outwardly from core 96 and coating 98. Core 96 can be made of any suitable alloy; the preferred alloy is 294 cupro-nickel alloy consisting of 45% nickel and 55% copper, as manufactured by American Alloy Wire Corp. of Sandy Hook, Conn. In a size 36 AWG wire formed from this alloy, a resistance of 11.76 ohms per foot is noted at 68° F.

Coating 98 can be made of a number of commercially available high temperature insulations; the preferred material is a modified polyester-imide sold by the P. D. George Company under the trademark "TERASOD 357". This material conforms to the National Electrical Manufacturers Association (NEMA) insulation requirements set forth in publication MW 1000, Section MW 77-C, for enameled round copper magnet wire. It has the American Chemical Society Chemical Abstracts Service registry number 26355-50-0, and the chemical name 4,4'-Diaminodiphenyl methane-ethylene glycol-trimellitic anhydride copolymer. Of course, other suitable high-temperature insulations can be used; for example, it is believed that polyimide as sold by DuPont under the trademark "KAPTON" would be suitable.

Serving layer 100 is preferably formed of 40 denier polyamide yarn spiral wound about core 96 and insulative coating 98. Serving layer 102 is similarly formed of a similar material, but is preferably reverse wound with respect to layer 100, that is, it has an opposite winding sense (e.g., clockwise) as compared to the winding sense of layer 100 (e.g., counterclockwise). It is to be understood that the preferred serving yarn size is optimized for 36 AWG wire and can be varied, for example, to accommodate other sizes of wire.

Third serving layer 104 is preferably reverse wound with respect to layer 102, and is preferably made of 40 denier yarn that is a mixture of nylon and acetate. The third serving layer is preferably treated with a solvent that has a mild attacking or fusing effect on the yarn, so as to prevent fraying and unraveling of the serving. One suitable solvent is acetone, which attacks the acetate yarn in the third serving. The preferred polyamide yarn for all serving layers is the nylon 66 type. The preferred acetate yarn is an acetic acid ester of cellulose such as celanese acetate yarn as manufactured by the Celanese Corporation of America. The serving layers described herein are commercially applied by Kerrigan & Lewis Mfg. Co., of Chicago, Ill. The celanese yarn softens in the range of 375° F. to 400° F., melting at about 500° F., while the nylon 66 yarn has a fairly clear melting point at 482° F. It is to be understood that other suitable materials are within the scope of the invention, so long as they have the desired tensile strength and heat transfer enhancing properties.

While the foregoing illustrative embodiment of the invention is a ground-on-over-current design, the present invention is also considered to extend to systems designed to trip by open-circuiting on over-current.

Figure 6:
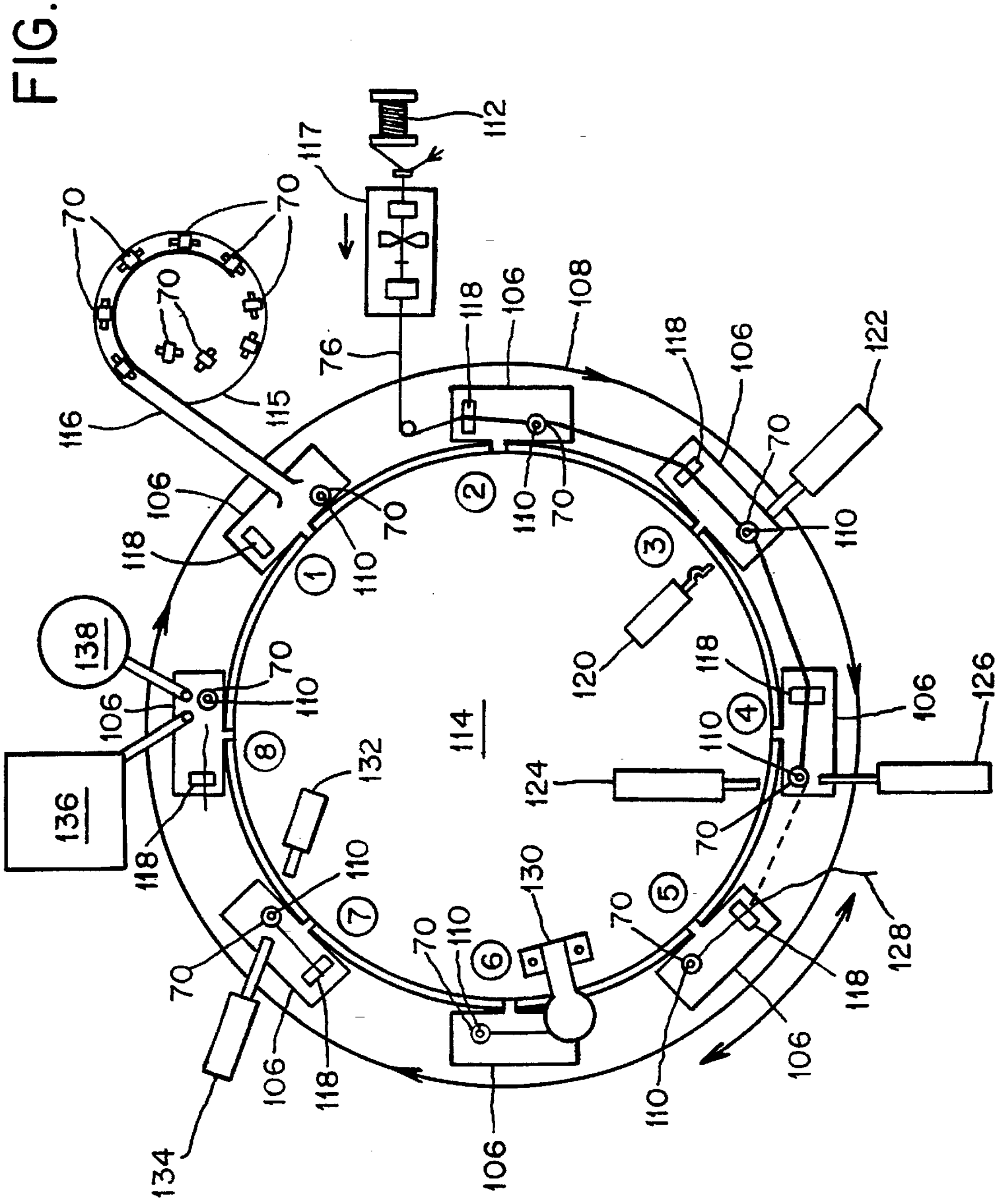
FIG. 6 is a schematic plan view of an automated apparatus for practicing a method of manufacturing a fast-acting, high resistance heat coil assembly according to the present invention.

Referring to FIG. 6, there is shown an apparatus suitable for manufacturing fast-acting, high resistance heat coil assemblies in accordance with the present invention. A plurality of work stations 106, a total of eight in this example, are mounted on a rotating member such as rotating plate 108. Each work station is provided with a spindle 110 for mounting one of a plurality of bobbins 70 to be wound with resistive heating wire 76 issuing from spool 112. It is to be understood that an insulated spring follower 64, shell 66, and contact pin 68, although not clearly visible due to the scale of FIG. 6, have been previously assembled to each of the bobbins 70. A fixed member such as fixed plate 114 is provided for mounting a variety of tools, to be discussed below, inside the circle of rotation described by work stations 106. Other mounting surfaces (not shown) are provided for mounting tools, also to be discussed below, outside the circle of rotation. Eight index points designated 1 through 8 are provided for performing a desired series of operations on the bobbins in the eight work stations.

The winding process begins with a plurality of bobbins 70 located in vibrating bowl feeder 115 which aligns the bobbins and delivers them to ramp 116. A mechanical picker (not shown) places the last delivered bobbin on spindle 110 of work station 106 located at first index point 1. Rotating plate 108 now rotates clockwise 45° so that the bobbin is at index point 2 adjacent spool 112 and wire feeder/stripper 117. Wire with a stripped end is passed through friction clamp 118 for welding to the central hub of bobbin 70 at index point 3 by welding heads 120, 122. After rotating again to index point 4, cutter heads 124 and 126 shear wire 76 close to bobbin 70, thereby leaving a "tail" 128 of wire to be wound on bobbin 70 at index point 5 by a toothed mechanism (not shown).

It is to be understood that, in the example illustrated in FIG. 6, eight bobbins 70 are simultaneously undergoing the various described operations. It is to be further understood that the bobbin 70 traced through the process from index point 1 is still at index point 4 during the just-described cutting process, and only has its own "tail" of wire for winding when it moves to index point 5 and the cutting process is performed on the following bobbin. Note that the wire is tensioned by friction clamp 118 during the winding process.

Following the winding process at index point 5, rotation is provided to index point 6 where a second stripper 130 strips the free end of the wire 76 for welding to conductive shell 66. Note that, although second stripper 130 is shown for completeness, it has been found in practice that it is desirable to eliminate its use, if possible, since it complicates the manufacturing process and leaves an exposed uninsulated piece of wire that can potentially cause shorting. In lieu of second stripper 130, it is preferable to employ wire 76 having a weld-compatible insulative coating and serving, that is, one that permits direct welding of the core to shell 66 without stripping. It has been found that the previously mentioned "TERASOD 357" modified polyester-imide insulation with polyamide and acetate yarn serving is weld-compatible.

Welding to the shell 66 is carried out by secondary welding heads 132 and 134 at index point 7, where the free portion of the wire is severed adjacent the weld. It can be subsequently removed from friction clamp 118. Index point 8 provides automated resistance testing by a test apparatus (not shown) with acceptable heat coil assemblies being automatically placed in bin 136, and rejects being automatically placed in bin 138.

The available length of wire for winding can be increased by pushing on the wire with a plunger (not shown), between two adjacent work stations, as the wire is dispensed.

It will be appreciated that the process just described requires high tensile strength wire that is preferably weld-compatible. Further, it is to be noted that the foregoing is merely one example of a method of manufacturing a fast-acting high-resistance heat coil assembly comprising providing a length of resistive heating wire having a conductive core, a heat-resisting insulative coating, and a relatively high tensile strength serving for resisting manufacturing stresses; fastening the wire to a spool member; and winding it about the spool member under tension sufficient to effectively minimize thermal contact resistance between the turns formed during winding. The spool member can include, for example, at least one of a bobbin and an elastically biased contact member.

EXAMPLE

A 36 AWG resistive heating wire with a nominal 0.0050 inch diameter, insulated with a nominal 0.000275 inch layer of the above-described TERASOD modified polyester-imide, was wound with three reverse servings of yarn. The inner two servings were 40 denier nylon 66 yarn while the outer serving was 40 denier yarn including a mixture of nylon 66 and celanese acetate fibers. The last serving was treated with acetone. The finished wire had a nominal 0.00975 inch diameter. When applied according to NEMA standards as set forth in Section MW 77-C of Publication Number MW 1000, the insulation exhibits a minimum 1200 volt breakdown strength with a minimum 0.0002 inch thickness.

In order to meet a requirement for 14–14.5 ohms total resistance, 3 second maximum trip at 1 amp, 210 second maximum trip at 0.25 amps, and hold of minimum 3 hours at 0.15 amps, approximately 14.5 inches of wire were wound about a bobbin and used in a heat coil assembly. The unit successfully met all requirements. Good manufacturability, including weld-compatibility of the insulation and serving and ample tensile strength, was noted. The serving increased the tensile strength from about 2.6 pounds to about 4 pounds.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A fast-acting, high resistance heat coil assembly for a telephone line surge protector module which trips in a predetermined time at a predetermined current value, said coil assembly comprising:

an elastically biased contact member;

a bobbin, said bobbin being secured to said contact member in a first temperature range to prevent relative motion between said bobbin and said contact member, said bobbin and said contact member being movable with respect to one another in a second temperature range; and a length of resistive heating wire having a conductive core, a heat-resisting insulative coating for said core, and a relatively high tensile-strength serving for resisting manufacturing stresses, said serving being operatively disposed about said core, a plurality of turns of said resistive heating wire being wound about at least one of said bobbin and said contact member, said resistive heating wire generating heat at a sufficient rate when carrying a current at least as great as said predetermined current value to substantially transition said contact member and said bobbin between said first and second temperature ranges, in a time interval no greater than said predetermined time, for tripping of said assembly by relative motion between said bobbin and said contact member.

2. A fast-acting heat coil assembly as defined in claim 1, wherein said heat-resisting insulative coating of said resistive heating wire is formed of a weld-compatible material.

3. A fast-acting heat coil assembly as defined in claim 2, wherein said weld-compatible material is modified polyester-imide.

4. A fast-acting heat coil assembly as defined in claim 1, wherein said serving includes a material that is deformable in said second temperature range for enhancing heat transfer between said plurality of turns of said resistive heating wire.

5. A fast-acting heat coil assembly as defined in claim 1, wherein said serving includes:

a first yarn layer having a first winding sense;

a second yarn layer disposed radially outward of said first yarn layer and having a second winding sense that is opposite to said first winding sense, said first and second yarn layers being made of polyamide yarn; and a third yarn layer disposed radially outward of said second yarn layer, said third yarn layer having a third winding sense that is the same as said first winding sense and is opposite to said second winding sense, said third yarn layer being made of a mixture of polyamide yarn and acetate yarn that has been treated with a solvent to prevent fraying and unraveling of said serving.

6. A telephone surge protector module which trips in a predetermined time at a predetermined current value, said module comprising:

a cap;

a generally hollow body having a first end and a second end, said first end having a main bore therethrough and at least first and second contact points thereon, said second end being sized and shaped for receipt of said cap;

an elongated ground pin having a first end inserted in said main bore and a second end formed with a ground plane thereon;

a first contact having a first end sized and shaped to interface with said first contact point and a second end with a contact surface;

a second contact having a first end sized and shaped to interface with said second contact point and a second end with a contact surface, said second end of said second contact being disposed opposite said second end of said first contact and defining a heat coil receiving gap therebetween;

an elastically biased contact member;

a bobbin, said bobbin being secured to said elastically biased contact member in a first temperature range to prevent relative motion between said bobbin and said elastically biased contact member, said bobbin and said elastically biased contact member being movable with respect to one another in a second temperature range, said elastically biased contact member and said bobbin being located in said heat coil receiving gap, said bobbin being electrically interconnected with said second contact and said elastically biased contact member; and a length of resistive heating wire having a conductive core, a heat-resisting insulative coating for said core, a relatively high tensile-strength serving operatively disposed about said core for resisting manufacturing stresses, a first end, and a second end, a plurality of turns of said resistive heating wire being wound about at least one of said bobbin and said elastically biased contact member, said first end of said wire being electrically interconnected with said first contact, said second end of said wire being electrically interconnected with said bobbin, said resistive heating wire generating heat at a sufficient rate when carrying a current at least as great as said predetermined current value to substantially transition said contact member and said bobbin between said first and second temperature ranges, in a time interval no greater than said predetermined time, for tripping of said module by relative motion between said bobbin and said elastically biased contact member, said elastically biased contact member contacting said ground plane as a result of said relative motion, whereby a current path to ground is provided for both said first contact and said second contact.

7. A telephone surge protector module as defined in claim 6, further comprising an over-voltage protection device providing a conduction path for shorting said first contact and said second contact to ground when said contacts are at a voltage potential greater than a predetermined trip voltage value.

8. A telephone surge protector module as defined in claim 7, wherein said over-voltage protection device is a solid state device.

9. A method of manufacturing a fast-acting, high resistance heat coil assembly, said method comprising the steps of:

providing a length of resistive heating wire having a conductive core, a heat-resisting insulative coating for said core, and a relatively high tensile-strength serving operatively disposed about said core for resisting manufacturing stresses;

fastening said wire to a spool member; and winding said wire about said spool member to form a series of turns, said winding taking place under a tension sufficient to effectively minimize inter-turn thermal contact resistance.

* * * * *